United States Patent
Williams et al.

(10) Patent No.: US 12,467,423 B2
(45) Date of Patent: Nov. 11, 2025

(54) FUEL INJECTION SYSTEM FOR HYDROGEN GAS

(71) Applicant: PHINIA DELPHI LUXEMBOURG SARL, Belvaux (LU)

(72) Inventors: Anthony John Williams, Middlesex (GB); Nicholas More, North London (GB); Daniel Pearce, London (GB)

(73) Assignee: PHINIA DELPHI LUXEMBOURG SARL, Belvaux (LU)

( * ) Notice: Subject to any disclaimer, the term of this patent is extended or adjusted under 35 U.S.C. 154(b) by 0 days.

(21) Appl. No.: 18/835,652

(22) PCT Filed: Feb. 3, 2023

(86) PCT No.: PCT/EP2023/052740
§ 371 (c)(1),
(2) Date: Aug. 2, 2024

(87) PCT Pub. No.: WO2023/148355
PCT Pub. Date: Aug. 10, 2023

(65) Prior Publication Data
US 2025/0146455 A1  May 8, 2025

(30) Foreign Application Priority Data

Feb. 3, 2022 (GB) ................................ 2201394
Feb. 3, 2022 (GB) ................................ 2201395

(51) Int. Cl.
*F02M 21/02* (2006.01)
*F02D 19/02* (2006.01)
(Continued)

(52) U.S. Cl.
CPC ....... *F02M 21/0254* (2013.01); *F02D 19/021* (2013.01); *F02D 41/0027* (2013.01);
(Continued)

(58) Field of Classification Search
CPC .............. F02D 19/021; F02D 41/0027; F02D 2200/0602; F02M 21/0206
See application file for complete search history.

(56) References Cited

U.S. PATENT DOCUMENTS

| | | | |
|---|---|---|---|
| 5,183,011 A | 2/1993 | Fujii et al. | |
| 2005/0279333 A1* | 12/2005 | Kweon | F01P 3/20 123/557 |

(Continued)

FOREIGN PATENT DOCUMENTS

| | | |
|---|---|---|
| CN | 102518531 A | 6/2012 |
| DE | 102015210482 A1 | 12/2016 |
| WO | 2006106145 A1 | 10/2006 |

OTHER PUBLICATIONS

International Search Report for PCT/EP2023/052740 dated May 25, 2023, 4 pages.

(Continued)

*Primary Examiner* — Kevin A Lathers
(74) *Attorney, Agent, or Firm* — WARNER NORCROSS + JUDD LLP (57) ABSTRACT

A controller for determining an injection strategy for a fuel injector within a hydrogen fuel injection system within an engine, the controller comprising: an input arranged to receive an engine operating parameter and a pressure signal associated with the pressure of hydrogen fuel available for injection from the injector in the fuel injection system; a processor arranged to determine an injection strategy for the injector in dependence on the received pressure signal and engine control parameter, the determined injection strategy comprising one or more injector control signals to control operation of the fuel injector; an output arranged to output the one or more control signals to the fuel injector.

12 Claims, 8 Drawing Sheets

(51) Int. Cl.
  *F02D 41/00* (2006.01)
  *F02M 51/06* (2006.01)
  *F02M 63/00* (2006.01)

(52) U.S. Cl.
  CPC .... *F02M 21/0206* (2013.01); *F02M 21/0263* (2013.01); *F02M 51/0614* (2013.01); *F02M 63/0022* (2013.01); *F02D 2200/0602* (2013.01)

(56) References Cited

U.S. PATENT DOCUMENTS

| | | | |
|---|---|---|---|
| 2007/0245982 A1* | 10/2007 | Sturman | F02D 13/0276 123/26 |
| 2008/0125955 A1* | 5/2008 | Boyer | F02M 21/0224 701/104 |
| 2009/0055077 A1 | 2/2009 | Schule | |
| 2012/0160221 A1* | 6/2012 | Munshi | F02M 21/0206 123/575 |
| 2014/0311454 A1 | 10/2014 | Pursifull et al. | |

OTHER PUBLICATIONS

Machine assisted English translation of CN102518531A obtained from <https://patents.google.com/patent> on Jul. 29, 2024, 5 pages.
Machine assisted English translation of DE102015210482A1 obtained from https://patents.google.com/patent on Jul. 29, 2024, 4 pages.

\* cited by examiner

FUEL INJECTION SYSTEM FOR HYDROGEN GAS

CROSS-REFERENCE TO RELATED APPLICATIONS

This application is the U.S. National Stage of International Application No. PCT/EP2023/052740 filed on 3 Feb. 2023, which claims priority to and all advantages of United Kingdom Application No. 2201395.7 filed on 3 Feb. 2022 and United Kingdom Application No. 2201394.0 filed on 3 Feb. 2022, the contents of which are incorporated herein by reference.

TECHNICAL FIELD

The present invention relates generally to a fuel system for injecting hydrogen gas into an engine for the purpose of combustion. The invention also relates to a fuel injection system for injecting hydrogen gas.

BACKGROUND

The ecologic transition dictates a drastic reduction of carbon dioxide emissions in the atmosphere and as a consequence there is an increasing pressure to replace carbon-based fossil fuels with renewable energy. In the automotive industry, this has seen the advent of alternative power-generation means to the traditional internal combustion engine running on fossil fuels. Whilst the electric battery solution has gained considerable momentum as a viable alternative to internal combustion engine technology, it does have limitations especially when considering heavy duty or off-road vehicles where the size and weight of the battery at the current level of technology is impractical.

An alternative comprise is to use the traditional internal combustion engine technology, but to replace the existing carbon-based fossil fuel with ecologically produced hydrogen. Extensive research has shown the feasibility of this solution and medium pressure hydrogen injection systems have been developed successfully. This medium pressure system injects the hydrogen into the cylinder once the cylinder inlet valve has closed and continues injection until the cylinder pressure reaches a pressure limit defined by the injection pressure. This pressure limitation restricts the injection window and dictates a 'pre-mixed' type of combustion strategy initiated by a spark-plug. The combustion strategy is therefore similar to that used in a gasoline-type (Otto-cycle) direct-injection system.

Increasing the operating pressure of Hydrogen fuel Injection systems is a potential route to improved engine performance and lower fuel consumption for a Hydrogen Internal Combustion Engine (ICE). A major disadvantage of increasing the injection pressure is that for a typical hydrogen storage mechanism, relying on high pressure availability at all times can limit the range of a vehicle, or require the need for an expensive and inefficient pump/compressor.

The most common hydrogen storage mechanism for vehicles is storage tanks holding compressed gas, which are re-charged to 350 bar (suited to heavy duty vehicles) or 700 bar (more compact storage mechanism compared to heavy duty vehicles but heavier. This storage mechanism is more suited to smaller vehicles).

Storage tank pressure reduces as the fuel is used, and a storage tank would typically be considered empty when the pressure reduces to approximately 20 bar.

For low pressure (less than approx. 10 bar) and medium pressure (less than approx. 40 bar) hydrogen injection systems, the storage tank pressure is reduced to the injector operating pressure by a gas pressure regulator before the gas is introduced to the accumulator/common rail immediately up-stream of the fuel injectors It is against this background that the invention has been devised.

SUMMARY OF THE INVENTION

Against this background, according to an aspect of the present invention provides there is provided a controller for determining an injection strategy for a fuel injector within a hydrogen fuel injection system within an engine, the controller comprising: an input arranged to receive an engine operating parameter and a pressure signal associated with pressure of hydrogen fuel available for injection from the injector in the fuel injection system; a processor arranged to determine an injection strategy for the injector in dependence on the received pressure signal and engine control parameter, the determined injection strategy comprising one or more injector control signals to control operation of the fuel injector; and an output arranged to output the one or more control signals to the fuel injector.

The present invention provides a controller that determines an injection strategy for an injector in a hydrogen gas fuel injection system (in a mono-fuel injection system). The controller receives an engine operating parameter (e.g. engine load and/or engine speed) and also a pressure signal that is associated with the hydrogen fuel pressure that is available for injection, the fuel pressure corresponding to the pressure of fuel within a storage tank. Based on the engine operating parameter and the pressure signal an injection strategy is determine that comprises one or more control signals which are output to the fuel injector. It is noted that the pressure signal may be associated with the current maximum pressure of hydrogen fuel available for injection from the injector in the fuel injection system.

A controller according to the above aspect of the present invention may enable a hydrogen injection system and control strategy that uses the highest pressure available from the hydrogen storage system at any given time. A fuel injection system controlled by a controller according to such an aspect of the present invention may be capable of operating over a pressure range from the maximum storage pressure of the fuel tank (full tank, eg 700 bar) down to the minimum storage pressure (a nominally "empty" tank may be maintained at 20 bar-50 bar for structural and refilling power/time reasons).

Such an injection system and control strategy may therefore take advantage of the increased engine efficiency available from high pressure injection when it is available, yet still retain the ability to operate at low injection pressure to maximise the vehicle range.

Unlike known low and medium pressure hydrogen injection systems, a controller according to the present invention does not regulate/control the hydrogen pressure available to the injectors. The injectors may either be exposed to the storage pressure of fuel within the fuel tank or be isolated from the fuel tank by a shut-off valve.

In order to maintain acceptable engine performance over a continuous range of injection pressure, the controller according to the aspects of the present invention may use a range of injection strategies (variation of the number of injections per cycle and the timing and quantity of each injection). The most appropriate injection strategy may be scheduled according to the available fuel pressure, along with other engine operating parameters, e.g. current engine speed and desired torque. In addition to the injection strategy, corresponding ignition strategies, including spark-timing, duration and intensity may be varied in a similar manner to optimize the overall combustion efficiency and engine performance.

Typically, the pressure range for the hydrogen gas to be injected is between 10 and 700 bar, depending on the engine speed/load requirements. By injecting the hydrogen gas at high injection pressures, the main injection offers efficiency benefits in terms of reduced pumping and thermal losses The advantages of a fuel injection system comprising a controller according to the above aspect of the invention are:

System simplicity and lower cost—Compared to high pressure systems requiring a compressor in order to maintain high operating pressures to maximise the vehicle range, the present arrangement enables the current pressure available from the fuel tank to be used when determining an injection strategy. Similarly, compared to low/medium pressure systems that require a regulator and potentially a heat exchanger, a simpler system is provided by fuel injection systems according to aspects of the present invention.

Fuel injection systems according to aspects of the present invention provide higher overall drive cycle efficiency compared with low/medium pressure systems.

Fuel injection systems according to aspects of the present invention are flexible in that they may operate according to different injection strategies depending on the available pressure of hydrogen fuel that is available (e.g. they may operate at the highest efficiency if/when fuel storage and refill facilities are maximized, but tolerant of less frequent refills and smaller fuel tanks as the $H_2$ infrastructure develops and expands).

The engine operating parameter may comprise engine speed and/or engine load.

The processor may be arranged to access a look up table which contains a plurality of injection strategies arranged by engine control parameter and the pressure of hydrogen fuel available for injection. The processor may be arranged to select an optimum injection strategy from the plurality of injection strategies in dependence on the received engine parameter and the received pressure signal. Alternatively, the processor may be arranged to access a mathematical model which is arranged to generate an injection strategy in dependence on the received engine parameter and the received pressure signal.

The one or more control signals in the determined injection strategy may be arranged to control an amount of fuel injected by the injectors. The one or more control signals in the determined injection strategy may be arranged to control injector valve opening and closing times.

The engine may comprise an engine cylinder having a cylinder piston which is driven by means of a crankshaft between bottom dead centre (BDC) and top dead centre (TDC) to perform a compression stroke and the determined injection strategy may comprise one or more of: a pilot injection of hydrogen fuel into the combustion chamber late in the compression stroke (e.g. within 60 degrees before the cylinder piston is at top dead centre); a pilot injection of hydrogen fuel into the combustion chamber followed by a main injection of hydrogen fuel into the combustion chamber late either side of top dead centre (TDC); a pilot injection of hydrogen fuel into the combustion chamber early in the compression stroke (e.g. around intake valve closure).

According to another aspect of the present invention there is provided a method for determining an injection strategy for a fuel injector within a hydrogen fuel injection system within an engine, the method comprising: receiving an engine operating parameter and a pressure signal associated with the pressure of hydrogen fuel available for injection from the injector in the fuel injection system; determining an injection strategy for the injector in dependence on the received pressure signal and engine control parameter, the determined injection strategy comprising one or more injector control signals to control operation of the fuel injector; and outputting the one or more control signals to the fuel injector.

According to a further aspect of the present invention there is provided a mono-fuel hydrogen fuel injection system for an engine comprising: a hydrogen fuel storage tank; an accumulator rail in fluid communication with the storage tank; one or more injectors in fluid communication with the accumulator rail; a pressure transducer arranged to determine the pressure of hydrogen fuel within the fuel injection system; a controller according to the above aspect of the present invention.

The accumulator rail may be in direct fluid communication with the hydrogen fuel storage tank. The pressure of hydrogen fuel within the fuel injection system as determined by the pressure transducer may correspond to the pressure within the storage tank.

It will be appreciated that preferred and/or optional features of any aspect of the invention may be incorporated alone or in appropriate combination in any of the other aspects of the invention also.

BRIEF DESCRIPTION OF THE DRAWINGS

So that the invention may be better understood, reference will now be made by way of example only to the following drawings in which.

DETAILED DESCRIPTION OF THE EMBODIMENTS

The present invention relates to a mono-fuel hydrogen fuel system for delivering hydrogen gas to a cylinder of an engine. The problem of low thermal efficiency of a medium pressure hydrogen fuel-injection system is solved by the invention as it is capable of injecting higher pressure hydrogen gas into the combustion chamber. This is further enhanced in the invention through the use of injection and ignition strategies to achieve a 'diffusion-type' combustion for the hydrogen gas.

In the Figures, similar parts are denoted with like reference numerals.

Figure 1:
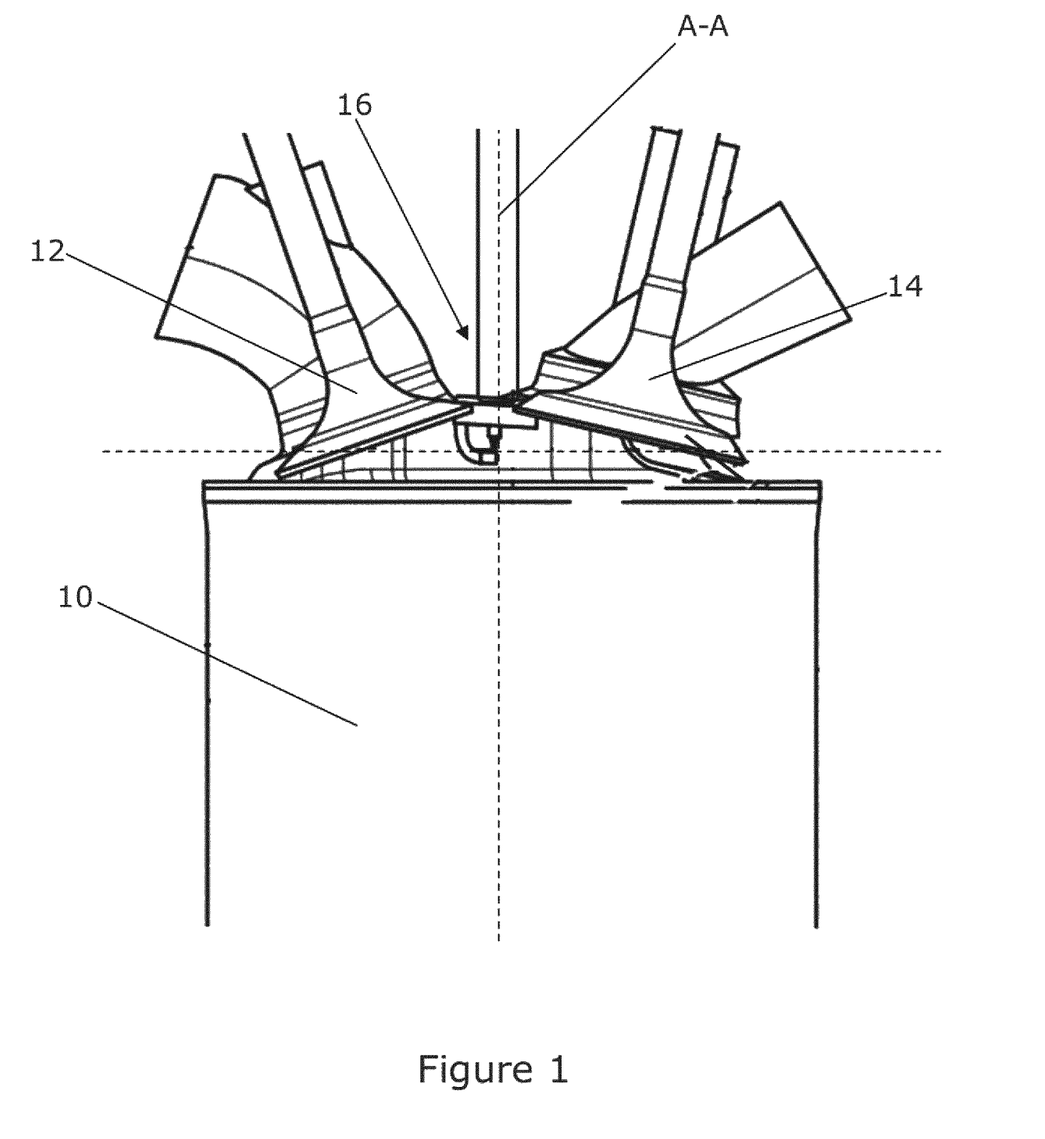
FIG. 1 is schematic drawing of a known combustion cylinder in a hydrogen gas fuel system.

Referring to FIG. 1, a known arrangement is shown in which a combustion cylinder 10 is located within a cylinder head (not shown) and includes at least one air intake valve 12 and at least one exhaust valve 14 (one of each is shown) as in a conventional combustion engine arrangement. An injector 16 is located centrally on top of the cylinder 10 between the intake and exhaust valves 12, 14 and is arranged to receive a supply of pressurised hydrogen gas from a source (not shown) of hydrogen gas. Under the control of the engine control unit (ECU) (shown in FIGS. 3 and 4), the injector 16 is arranged to injector hydrogen gas into the engine cylinder 10 in accordance with an injection schedule which will be described in further detail below. The injector has a longitudinal central axis A-A.

A cylinder piston (not shown in FIG. 1) is movable within the engine cylinder 10 through a piston cycle between a bottom dead centre (BDC) position and top dead centre (TDC) position by means of a crank drive arrangement (not shown). The position of the cylinder piston within the piston cycle is referred to by reference to the crank angle (CA) relative to TDC. The convention which shall be used herein when referring to positions of the cylinder piston through the piston cycle is to define top dead centre (TDC) as occurring at 360° CA. For example, reference to 300° CA shall be taken to mean a crank angle of 60° before TDC and a reference to 420° CA shall be taken to mean a crank angle of 60° after TDC.

Figure 2:
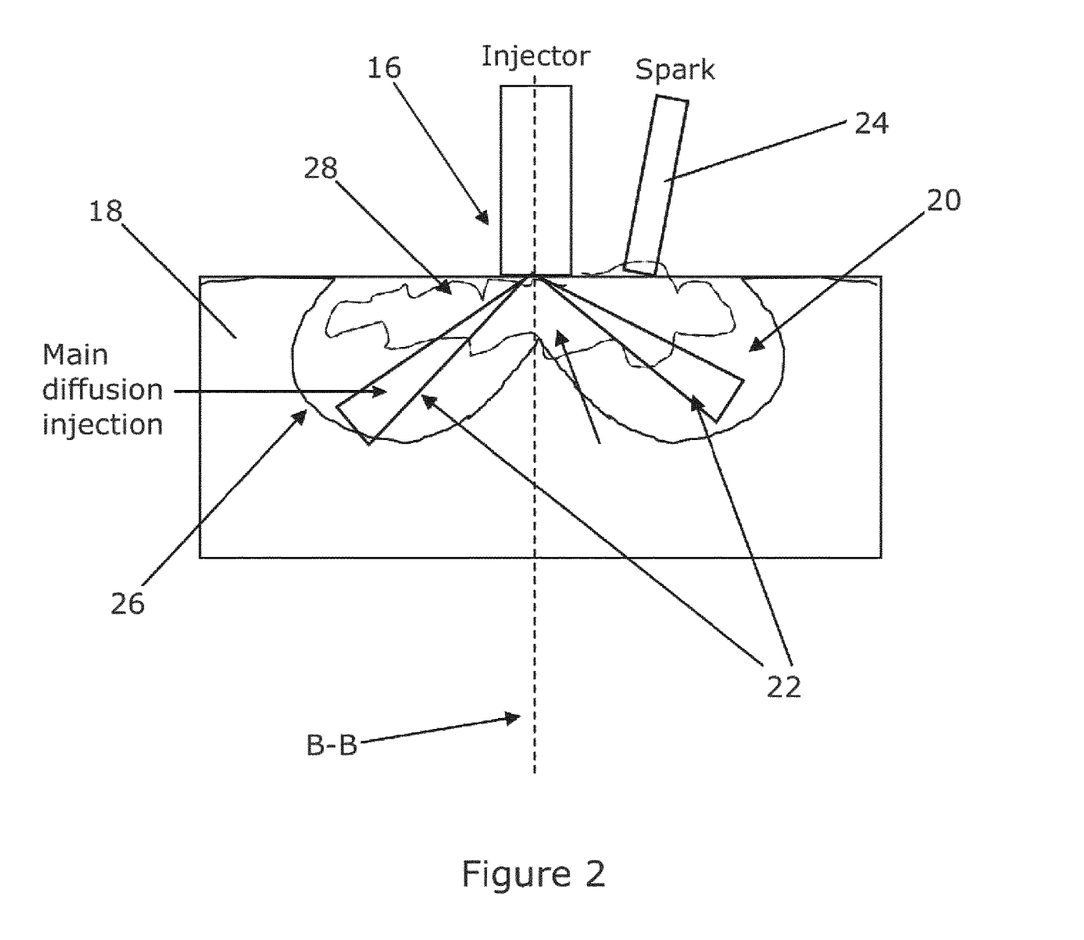
FIG. 2 is a schematic diagram of the combustion cylinder in FIG. 1, with an injector and spark plug arrangement for initiating combustion of hydrogen gas injected into the cylinder

FIG. 2 shows the position of the cylinder piston 18 within the cylinder. The cylinder piston 18 has a longitudinal axis B-B which ideally aligns with the injector axis A-A. The upper end of the cylinder piston 18 defines, together with the walls and ceiling of the cylinder, a combustion space 20 into which an injected spray or jet 22 of hydrogen gas is delivered by the injector 16. Adjacent to the injector 16, a spark plug 24 is located in a broadly central position on the ceiling of the cylinder and is arranged to create a spark to ignite the injected hydrogen gas jet 22 within the combustion space 20. The upper end of the cylinder piston 18 is shaped to include a bowl 24 into which the hydrogen gas is injected. The bowl 26 is shown in FIG. 2 to be a re-entrant bowl of the type which is familiar for use in diesel engines. The re-entrant bowl 26 includes sides which slant inwards towards a central axis B-B of the piston. In a diesel engine, the re-entrant nature of the piston bowl 26 serves to optimise the air-fuel mixing and the subsequent combustion. In the present invention, the re-entrant bowl may be preferable, but because of the different dynamic characteristics of a jet of hydrogen gas compared to a jet of diesel fuel, other piston bowl geometries may be used.

The compression ratio is typically, although not exclusively, between 14:1 and 22:1. The compression ratio is defined as the ratio between the swept volume of the cylinder piston and the combustion chamber at its minimum volume (TDC).

Figure 3:
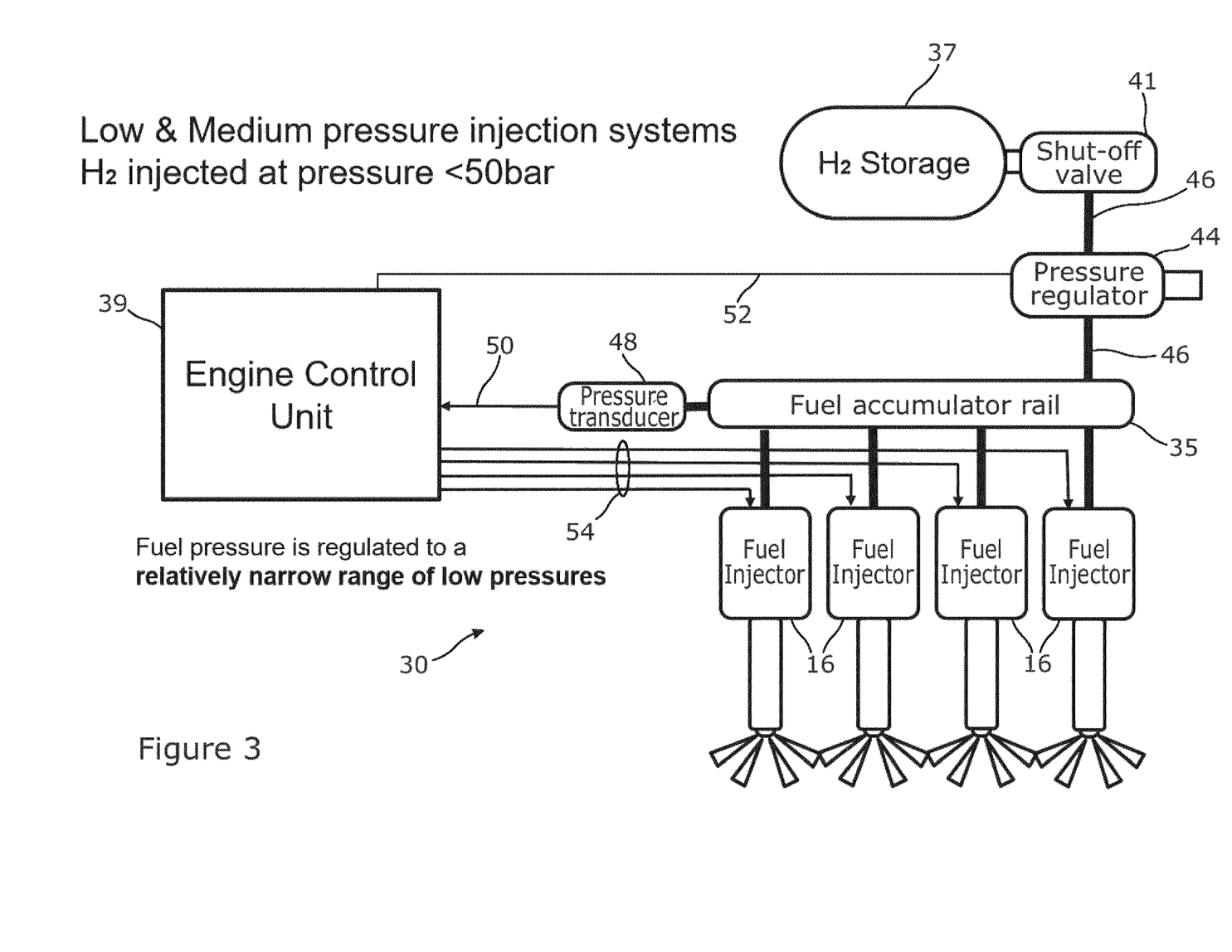
FIG. 3 is schematic drawing of a known fuel injection system in a hydrogen gas fuel system.

Referring to FIG. 3, a known injection system for use in low and medium pressure systems is shown in which hydrogen is injected at pressures of below around 50 bar by injectors into the combustion cylinders located within a cylinder head as in a conventional combustion engine arrangement.

FIG. 3 shows a schematic drawing of a fuel injection system 30 comprising a plurality of fuel injectors 16 which are in fluid communication with and supplied by an accumulator rail 35. The accumulator rail 35 is in turn in fluid communication with a store of hydrogen fuel in a storage tank 37. The injectors 16 are under the control of an engine control unit (ECU) 39.

The fuel injection system further comprises a shut-off valve 41 which is configured to be open during engine ignition "on" and shut during engine ignition "off" and a pressure regulator 44 in the fuel line 46 between the storage tank 37 and the accumulator rail 35. The pressure regulator 44 is under the control of the engine control unit 39.

The accumulator rail 35 is further associated with a pressure transducer 48 which is configured to measure the hydrogen fuel pressure within the rail 35.

In operation hydrogen fuel is supplied from the tank 37 to the accumulator rail 35 and then injected by the injectors 16 into the engine. The ECU 39 receives a pressure signal 50 from the pressure transducer 48 and sends a control signal 52 to the pressure regulator 44 in order to regulate the fuel pressure within an operating pressure range (a relatively narrow range of low pressures) of the injectors 16. The ECU 39 then sends control signals 54 to the fuel injectors in accordance with engine operating parameters such as engine load (throttle demand from the driver) and engine speed.

It is to be appreciated that during operation the pressure transducer 48, ECU 39 and pressure regulator 44 form a feedback loop to maintain the fuel pressure within the accumulator rail 35 within an optimum pressure range for the injectors 16.

It is noted that the arrangement shown in FIG. 3 can introduce inefficiencies into the fuel injection process. For example, if the storage tank 37 pressure is high then the system 30 first regulates the pressure of the fuel down to the operating pressure of the injectors 16 before effectively increasing the fuel pressure back up again as the fuel is compressed in the engine cylinders. The arrangement of FIG. 3 requires the presence of a regulator but also potentially a heat exchanger (not shown) which would increase the complexity of the fuel injection system.

Figure 4:
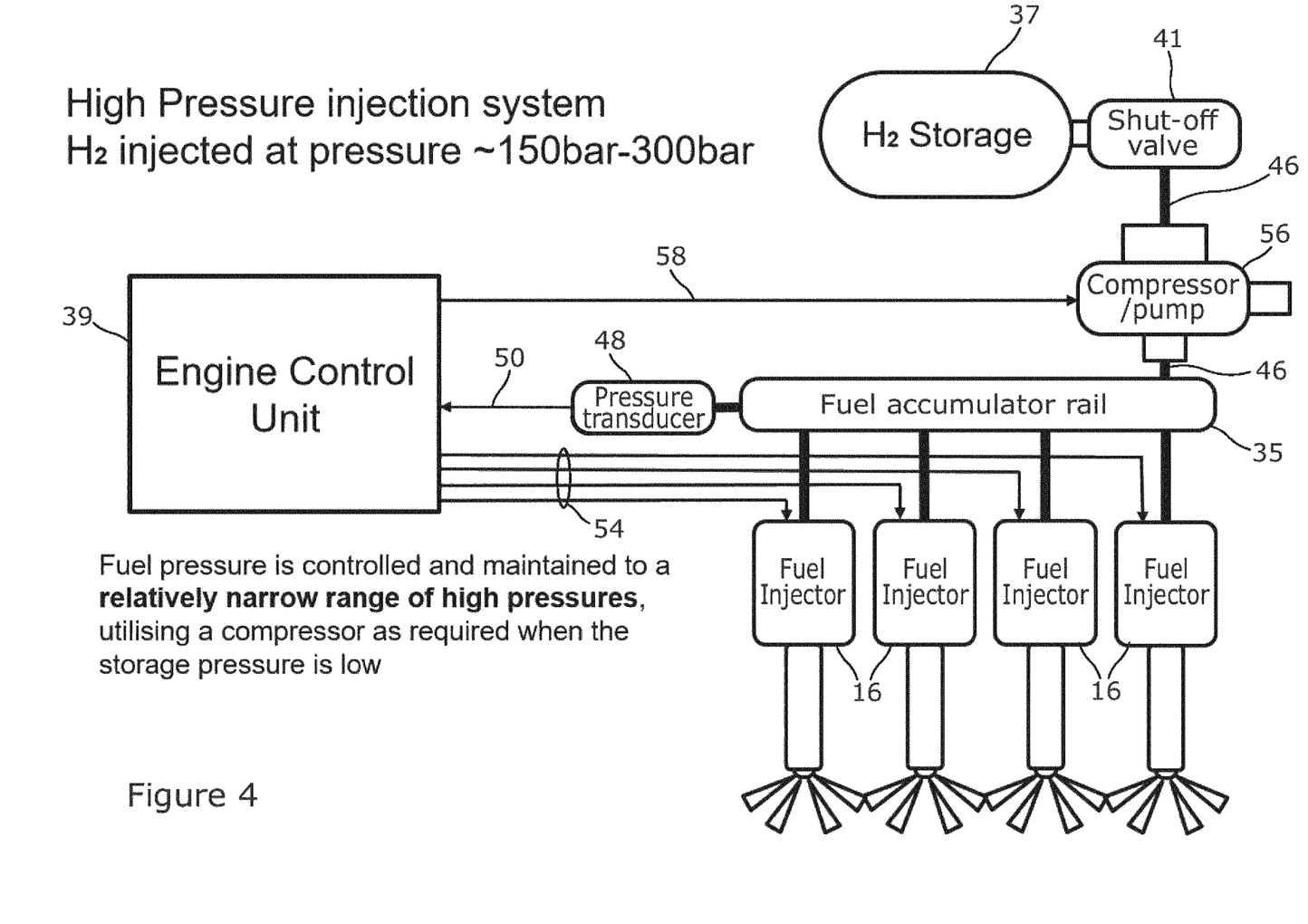
FIG. 4 is a schematic diagram of a further known fuel injection system in a hydrogen gas fuel system.

FIG. 4 shows a schematic drawing of a known fuel injection system 30 for use in high pressure systems in which hydrogen is injected at pressures of between approximately 150-300 bar by injectors into the combustion cylinders located within a cylinder head as in a conventional combustion engine arrangement. In FIG. 4, like reference numerals with FIGS. 1, 2 and 3 denote equivalent/similar parts/features.

The general injection system depicted in FIG. 4 is similar to that shown in FIG. 3. However, instead of a pressure regulator 44, the fuel line 46 now comprises a compressor/pump 56 which is under the control (via control signals 58) of the ECU 39.

In operation hydrogen fuel is supplied from the tank 37 to the accumulator rail 35 and then injected by the injectors 16 into the engine. As in FIG. 3, the ECU 39 receives a pressure signal 50 from the pressure transducer 48 but in the case of FIG. 4 the required pressures within the accumulator rail 35 are at a higher level (e.g. 150-300 bar) and so the ECU3 9 sends a control signal 58 to the compressor/pump 56 in order to control and maintain the fuel pressure within an operating pressure range of the injectors 16. The ECU 39 then sends control signals 54 to the fuel injectors 16 in accordance with engine operating parameters such as engine load (throttle demand from the driver) and engine speed.

It is to be appreciated that during operation the pressure transducer 48, ECU 39 and pump/compressor 56 form a feedback loop to maintain the fuel pressure within the accumulator rail 35 within an optimum pressure range for the injectors 16.

It is noted that the arrangement shown in FIG. 4 increases the complexity of the fuel injection system as the pump/compressor 56 is required to maintain high operating pressures in order to maximise the vehicle's range.

Figure 5:
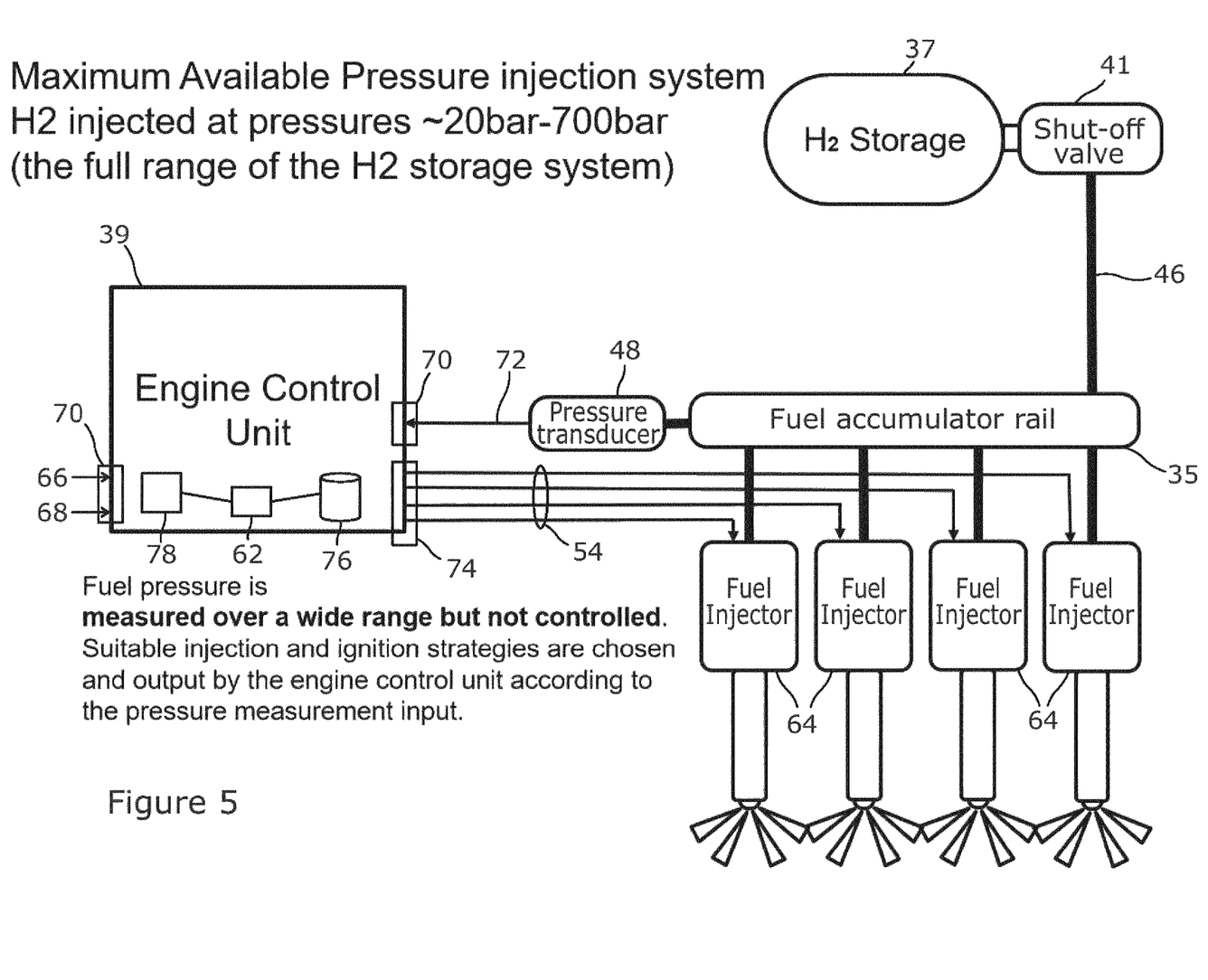
FIG. 5 is a schematic diagram of fuel injection system in accordance with an embodiment of the present invention.

FIG. 5 shows a schematic drawing of a fuel injection system 60 in accordance with an embodiment of the present invention in which hydrogen is injected at pressures of between approximately 20-700 bar by injectors into the combustion cylinders located within a cylinder head as in a conventional combustion engine arrangement In the following description, the term "engine load" is used as a synonym for "fuel demand" and takes the units of mg fuel. The term engine speed is used in the normal context and takes the units of rpm. Where different combinations of injections or part injections are used in each injection cycle, such combinations are referred to as injection "strategies". The term "operating condition" is used to define a given combination of engine speed and engine load.

Referring to FIG. 5, a fuel injection system 60 in accordance with an embodiment of the present invention comprises one or more fuel injectors 16 (one of which is shown in this example) controlled by means of an engine control unit (or controller) 39 including a computer or processor 62. The controller 39 is arranged to generate the injector control signals 54, typically in the form of an electrical current, which is applied to the injector 64 to control the movement of an injector valve needle (not shown). In a unit injector, for example, the control signal 54 takes the form of a current waveform that is applied to an electromagnetic actuator to control valve needle lift. The current is applied to the injector in the form of a waveform, and when the current in the waveform exceeds a predetermined threshold value, the valve needle of the injector is caused to open, thereby to inject fuel into the engine cylinder. When the current in the waveform decreases below the predetermined threshold value the valve needle is caused to close, thus halting any injection of fuel into the engine cylinder.

In order to optimise operation of the injectors, the control signal 54 must be selected to start at the correct time and be of the correct duration. The timing and duration of the signal 54 is generally dependent on one or more engine operating parameters: a first control parameter 66 representative of engine load (as determined by the throttle position set by the driver) and a second operating parameter 68 representative of engine speed. The two engine operating parameters are supplied to an input 70 of the controller 39.

In accordance with embodiments of the present invention, the controller/ECU 39 shown in FIG. 5 determines an injection strategy for the injectors 64 using an engine operating parameter (66, 68) and additionally the pressure of hydrogen fuel within the fuel system 60 as determined by the pressure transducer 48. During operation therefore the controller receives, via the input 70, the engine control parameter (66, 68) and a pressure signal 72 from the pressure transducer 48, the pressure signal 72 being associated with pressure of hydrogen fuel available for injection from the injector 64 in the fuel injection system. It is noted that in the fuel injection system 60 shown in FIG. 5 there is no pressure regulator 44 or pump compressor 56 between the tank 37 and the fuel rail 35. It is therefore to be appreciated that the fuel rail 35 and fuel injectors 16 are exposed to the fuel pressure within the tank 37.

The processor 62 is then arranged to determine an injection strategy for the injectors 64 in dependence on the received pressure signal 72 and engine control parameter (66, 68), the determined injection strategy comprising one or more injector control signals 54 to control operation of the fuel injector 64. The control signals 54 are output via an output 74 of the ECU/controller 39 to the fuel injectors 64.

The engine operating parameters used by the processor to determine the injection strategy comprise the engine load and the engine speed. The processor 62 may use the received engine operating parameters (66, 68) and the received pressure signal 72 to select the most appropriate/optimum injection strategy for the vehicle's engine/fuel injection system 60 from a look up table 76 that contains a plurality of injection strategies arranged by engine control parameter(s) and by pressure of the hydrogen fuel available for injection. [The look up table 76 is shown as part of the controller 39 in FIG. 5 but may be located elsewhere within the vehicle with the processor 62 being in communication with it.]

As an alternative to a look up table 76, the processor 62 may be in communication with a mathematical model 78 which is arranged to generate an injection strategy in dependence on the received engine parameter (66, 68) and the pressure of hydrogen fuel within the fuel injection system 60 as determined by the pressure transducer 48. [The mathematical model 78 is shown as part of the controller 39 in FIG. 5 but may be located elsewhere within the vehicle with the processor 62 being in communication with it.]

The injection strategy determined by the processor 39 comprises fuel amount parameters as well as fuel timing and ignition parameters. The injector control signal 54 which is determined either from the look up table 76 or mathematical model 78, is arranged to control the fuel amount parameters of hydrogen fuel injected by the injectors 64 and may comprise control signals to control the opening and closing of injector vales and also to control the timing of ignition.

In contrast to the fuel injection systems shown in FIGS. 3 and 4, the accumulator rail 35 in the fuel injection system according to embodiments of the present invention is not maintained within an optimum pressure range for the injectors. Instead, the pressure within the accumulator rail 35 varies from a maximum pressure corresponding to the pressure within the tank 37 when it is full, to a minimum pressure corresponding to the pressure within the tank 37 as it approaches empty. The injection strategy as determined by the processor 39 in accordance with embodiments of the present invention is varied such that suitable control signals 54 may be output to the fuel injectors 16 to enable fuel injection to occur across a range of pressures of between approximately 20-700 bar.

Figure 6:
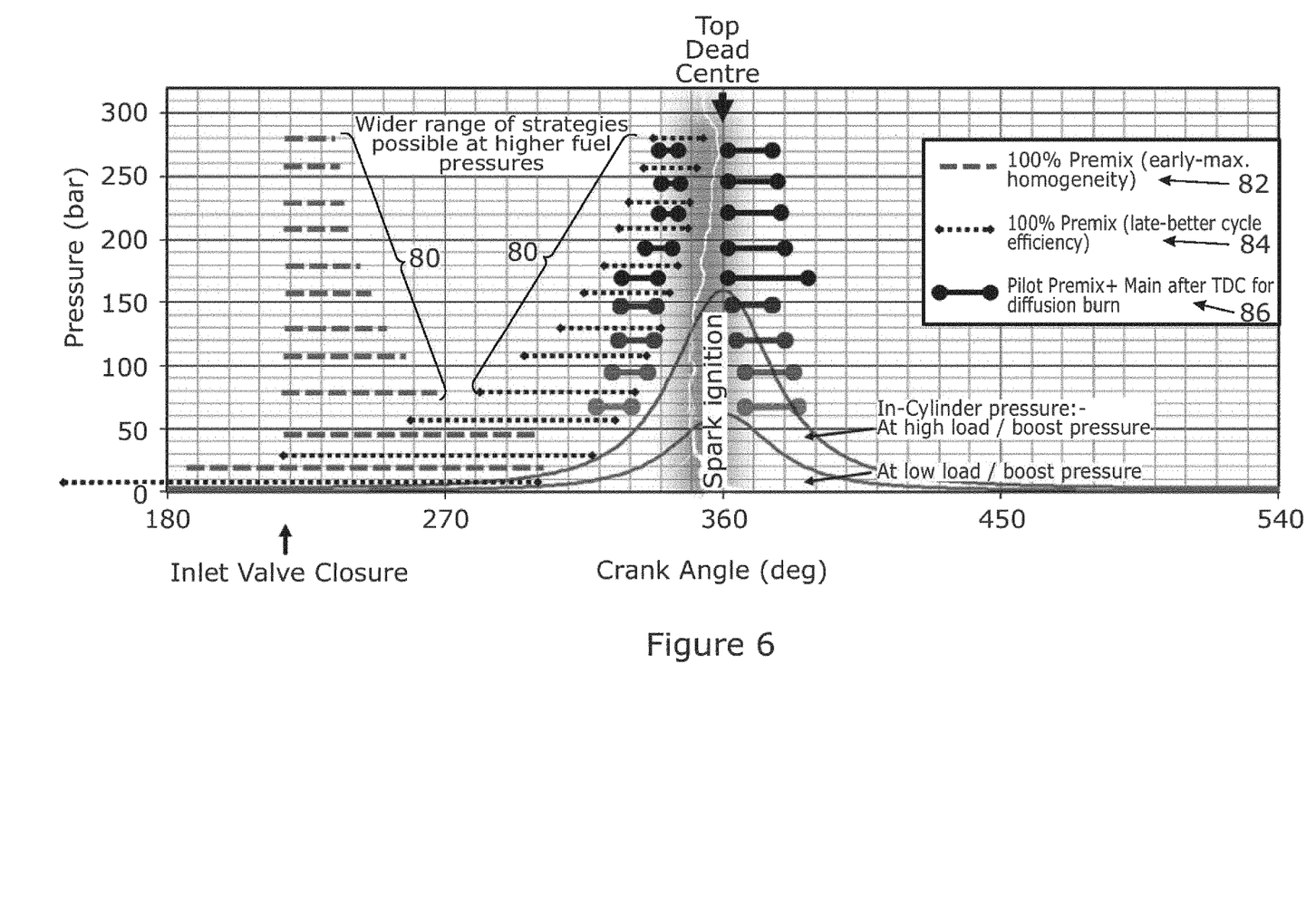
FIG. 6 is an illustration of a possible fuel injection strategies that are dependent on available fuel pressure in accordance with an embodiment of the present invention.

FIG. 6 illustrates a range of possible injection strategies 80 that might be selected as the optimum strategy as a function of fuel pressure and crank angle. As noted above, a crank angle of 360 degrees corresponds to top dead centre. In FIG. 6, intake valve 16 closure occurs around 220 degrees.

Three general injection strategy types are shown: a pre-mixed injection strategy 82 in which the fuel is injected early in the cycle (e.g. starting around intake valve closure); a pre-mixed injection strategy 84 in which the hydrogen fuel is injected relatively late in the injection cycle (i.e. close to top dead centre); and a pilot/main injection strategy 86 in which a pilot injection is made before TDC and followed by a main injection after TDC.

It may be seen from FIG. 6 that more injection strategies are available when the available fuel supply pressure is high. The late and early options for pre-mix injections shown are extremes of a range, and it is possible to use single or multiple injections within this range.

When the available fuel supply pressure is low, the options for injection strategy are more limited, especially at higher engine loads.

Higher engine efficiency is possible when the available fuel pressure is high, and it is anticipated that vehicle operators will maintain the availability of high fuel pressure by more regular tank re-fills and/or larger storage tanks on the vehicle if/when possible.

At lower available fuel pressure (tank approaching empty) the engine efficiency falls but is still comparable to that possible from typical low and mid pressure injection systems.

FIG. 6 shows to pressure curves representing the in-cylinder pressure at high and low loads. It can be seen that the in-cylinder pressure is highest around TDC, but is dependent on the engine load and boost pressure.

The hydrogen fuel pressure should be higher than the in-cylinder pressure in order to allow injection to take place. Ideally the hydrogen fuel pressure is significantly higher than the in-cylinder pressure in order to get a high hydrogen fuel flow rate.

It is noted that it is a low hydrogen fuel rate that causes low hydrogen pressure injections to be limited to early timings. Higher hydrogen fuel pressures enable late premix and pilot and post strategies.

When the hydrogen fuel pressure is greater than around 2 times the in-cylinder pressure then cylinder pressure has no effect on the injected fuel flow and this is a preferred injection environment as it allows the maximum flexibility in injection strategies.

Figure 7:
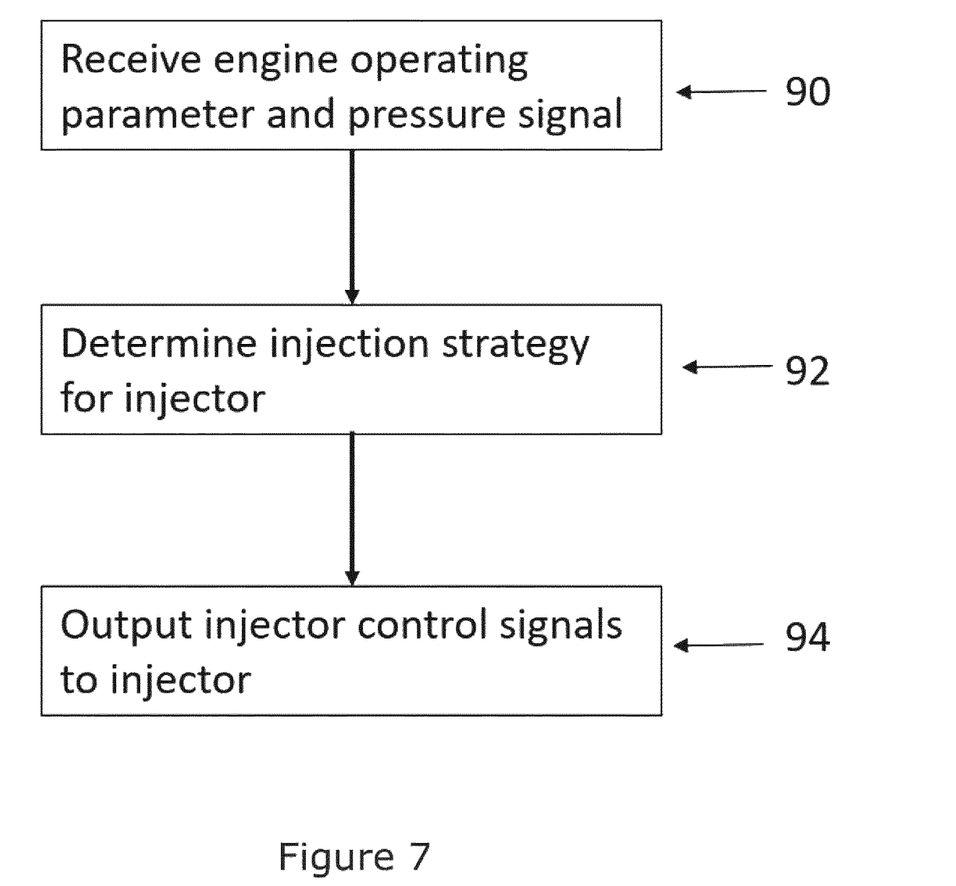
FIG. 7 is a method of operating a fuel injection system in accordance with an embodiment of the present invention.

FIG. 7 shows a method of operating a fuel injection system in accordance with an embodiment of the present invention.

In step 90 the processor 62 within the controller 39 receives an engine operating parameter and a pressure signal. In step 92, the processor determines the injection strategy for the injector based on the received engine operating parameter (66,68) and pressure signal 72. In step 94 the injector control signal(s) 54 is (are) output to the fuel injector 64.

Figure 8:
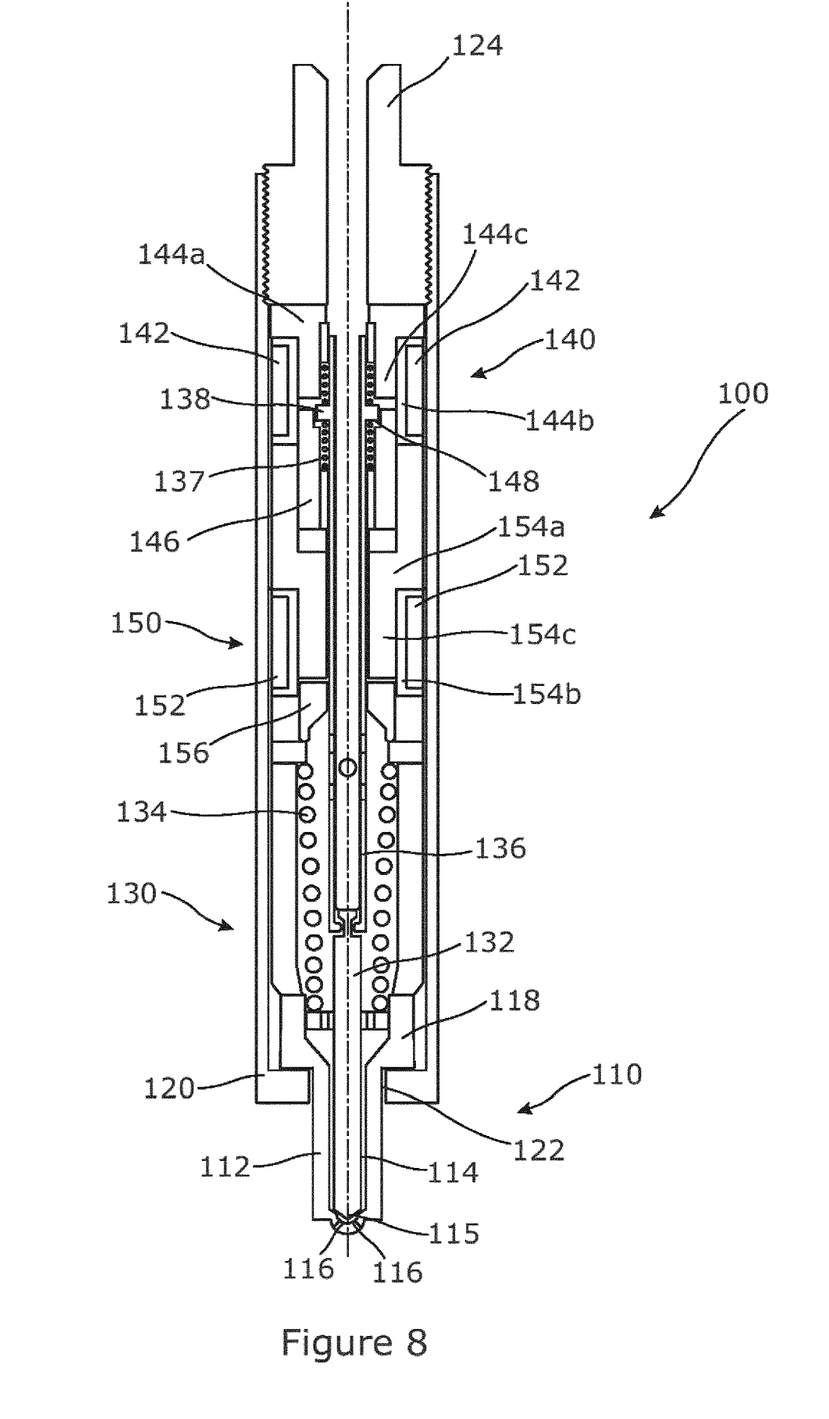
FIG. 8 is a cross sectional view of a fuel injector suitable for use in accordance with embodiments of the present invention.

FIG. 8 shows a first embodiment of a fuel injector 100 for gaseous fuel for use in an internal combustion engine. The fuel injector 100 of FIG. 8 is suitable for use as the injectors 64 in FIG. 5. The fuel injector 100 is of the inwardly-opening type and comprises an injection nozzle 110 having a substantially cylindrical nozzle body 112, through which extends a nozzle bore 114. The nozzle bore 114 terminates in one or more nozzle outlets 116, which extend through the thickness of the walls of the nozzle body 112 to enable fluid communication between the nozzle bore 114 and the environment external to the fuel injector 100.

At the opposite end of the injection nozzle 110 to the nozzle outlet(s) 116, the nozzle body 112 defines a shoulder region 118 which has an increased outer diameter when compared to the rest of the nozzle body 112. The shoulder region 118 is engaged with a housing 120, such that the nozzle body 112 extends and protrudes through an opening 122 of the housing 120. The housing 120 contains the other components of the fuel injector 100, with the components being held within the housing 120 by a capnut 124.

The fuel injector 100 comprises a valve needle assembly 130 which is operable to control fuel delivery through the at least one nozzle outlet 116. The valve needle assembly 130 comprises a valve needle 132 received within the nozzle bore 114 and engaged with a seat region 115 of the injection nozzle 110 defined at the meeting point between the nozzle bore 114 and the at least one nozzle outlet 116. This defines a 'closed' position of the valve needle assembly 130, with fuel prevented from flowing out of the fuel injector 100 through the nozzle outlet(s) 116, in use. In contrast, an 'open' position of the valve needle assembly 130 is defined when the valve needle 132 is not engaged with the seat region 115, with fuel consequently allowed to flow out of the nozzle outlet(s) 116 via the nozzle bore 114, in use.

The valve needle assembly further comprises a valve needle return spring 134 that is operably engaged with the valve needle 132. The valve needle return spring 134 provides a return force that acts on the valve needle 132, urging it into engagement with the seat region 115. The valve needle assembly may also comprise a pull tube 136, which is operably engaged with the valve needle 132 and extends through the fuel injector 100 away from the injection nozzle 110 and the valve needle assembly 130. A pull tube return spring 137 is coupled to an engagement region 138 of the pull tube 136 to hold the pull tube 136 in engagement with the valve needle 132.

The pull tube 136 is surrounded by a substantially cylindrical gas tube, which substantially fills the space between the housing 120 and the pull tube 132. The gas tube comprises first and second actuator arrangements 140, 150, which are arranged axially in series along a longitudinal axis L of the fuel injector 100. Each actuator arrangement 140, 150 comprises a coil 142, 152, the coil being mounted concentrically on a body 144, 154 in a radially outer region of the respective actuator arrangement 140, 150. The actuator arrangements 140, 150 further comprise armatures 146, 156, located radially inward of the coils 142, 152, which are used to generate a magnetic field. The first armature 146 is slidably mounted on the pull tube 136, with a clearance 148 provided between the first armature 146 and the engagement region 138 of the pull tube 136. The second armature 156 is directly mounted on the pull tube 136 such that it is engaged with an outer surface thereof and such that the motions of the two components are coupled.

Each body 144, 154 comprises two distinct regions: a first, radially inner region 144a, 154a and a second region 144b, 154b located radially between the radially inner region 144a, 154a and the respective coil 142, 152 such that the second region 144b, 154b effectively surrounds the coil 142, 152. Each of the first regions 144a, 154a has a high magnetic permeability, while the second regions 144b, 154b have a low magnetic permeability. As can be seen in FIG. 2, the outward radial extent of the armatures 146, 156 from the longitudinal axis L corresponds to the inward radial extent of the second regions 144b, 154b. Each of the first regions 144a, 154a therefore comprise sub-regions 144c, 154c that are aligned with the armatures 146, 156 parallel to the longitudinal axis L. As will be explained in further detail below, the low magnetic permeability of the second regions 144b, 154b effectively act as a barrier to the passage of magnetic flux therethrough, thereby limiting the 'wasted' magnetic flux that does not act on the armatures 146, 156.

When discussing values of magnetic permeability, it is worth considering that the magnetic permeability of a material changes as a function of the applied magnetic field, H, with the permeability reaching a maximum at small, but non-zero, value of H and subsequently declining and tending towards 1 as the material becomes magnetically saturated. The relevant value of the magnetic permeability of the first regions 144a, 154a and the second regions 144b, 154b, is therefore dependent on the strength of the magnetic field applied by the coils 142, 152. All values subsequently referred to below should be taken to be representative of the values of the magnetic permeability of the respective region 144a, 144b, 154a, 154b in use when subjected to a magnetic field by the coils 142, 152.

The second regions 144b, 154b should have as low a magnetic permeability as possible. Therefore, the second regions would ideally have a relative permeability (defined as the ratio of the magnetic permeability of the material to that of free space, $\mu_0$) of 1 or as close thereto as possible. Annealed 316 austenitic stainless steel fits this criterion well but may be too soft for the structural requirements of the construction of the gas tube 120. Mechanical treatments to mechanically harden the 316 stainless steel will also harden it magnetically and increase its magnetic permeability). In practice, therefore, the relative permeability of the second regions 144b. 154b is at most 50. Preferably, the relative permeability of the second regions 144b, 154b is at most 40, at most 25, or at most 10.

With regards to the first regions 144a, 154a (including the sub-regions 144c, 154c), while it would be desirable for the first regions 144a, 154a to have as high a magnetic permeability as possible, the required trade off in magnetic and material properties limits this in practice. However, the relative permeability of the first regions 144a, 154a is at least 500 and preferably at least 1000. The first regions 144a, 154a therefore have a magnetic permeability (or equivalently a relative permeability) that is at least an order of magnitude greater than that of the second regions 144b, 154b. It should be noted that, while the absolute values of the permeabilities of the first and second regions 144a, 144b, 154a, 154b are important, most crucial is the relationship between them, such that the desired effect of creating preferred and less preferred pathways for magnetic flux can be realised.

In operation, an electrical current is passed through the coils 142, 152. This creates magnetic fields passing through the centre of each coil 142, 152, with lines of magnetic flux substantially parallel to the longitudinal axis L inside the coils. As a result of their raised magnetic permeability compared to the second regions 144b, 154b, the lines of magnetic flux preferentially pass through the first regions 144a, 154a, and in particular through the sub-regions 144c, 154c thereof. As a result of the magnetic flux passing through the sub-regions 144c, 154c, a force is exerted on the armatures 146, 156 that acts to move them away from the injection nozzle 110.

Since the first armature 146 is slidably mounted on the pull tube 136, the first armature 146 slides up the pull tube 136 (i.e. away from the injection nozzle 110) and closes the clearance 148 before engaging with the engagement region 138 of the pull tube 136. With the first armature 146 now engaged with the engagement region 138, both armatures 146, 156 are coupled to the pull tube 136 and further upward movement of the armatures 146, 156 causes the valve needle assembly 130 to move against the action of the return force provided by the valve needle return spring 134 and so act to move the valve needle assembly 130 to an open position. In this way, the coils 142, 152 and the first and second actuator arrangements 140, 150 act to apply an opening force to the valve needle assembly 130. The action of the slidable first armature 142 creates an impulse on engagement with the engagement region 138, providing an additional force that assists with initial opening of the valve needle assembly 130.

With the valve needle assembly 130 in an open position, fuel is allowed to flow out of the fuel injector 100 via the nozzle bore 114 and nozzle outlet(s) 116. When the fuel has been injected, the electrical current supplied to the coils 142, 152 is stopped. This stops the generation of magnetic flux by the coils 142, 152 and consequently the force acting on the first and second actuator arrangements 140, 150 is removed. The action of the valve needle return spring 134 then returns the valve needle assembly 130 to the closed position, thereby preventing further delivery of fuel from the injection nozzle 110.

The different magnetic properties of the first regions 144a, 154a and the second regions 144b, 154b optimise the path of magnetic flux created by current passing through the coils 142, 152. By creating a preferential path for magnetic flux that only passes through the armatures 146, 156, the construction of the first and second actuator arrangements 140, 150 enable more efficient use of the magnetic flux generated. This means that either less energy is wasted to generate the same force, or that a higher overall actuation force can be produced to act on the valve needle assembly 130, allowing the injection pressure to be increased. The competing magnetic and mechanical demands on the system can therefore be mitigated through the use of regions with different magnetic permeabilities.

While it may be the case that different regions of the bodies 144, 154 have differing magnetic permeabilities as a result of the first regions 144a, 154a and the second regions 144b, 154b being made from different materials, it may also be the case that the first and second regions 144a, 144b, 154a, 154b may be formed by one material that has undergone different treatments so as to create different permeabilities. This may be different thermal or mechanical treatments, for example, which may be applied to separate components made from the same material or may even be applied to a single contiguous body 142, 152.

It will be appreciated that further embodiments of the invention are envisaged without departing from the scope of the appended claims.

The invention claimed is:

1. A controller for determining an injection strategy for a fuel injector within a hydrogen fuel injection system within an engine, the controller comprising:
   an input arranged to receive an engine operating parameter and a pressure signal associated with the pressure of hydrogen fuel available for injection from the injector in the fuel injection system;
   a processor arranged to determine an injection strategy for the injector in dependence on the received pressure signal and engine control parameter, the determined injection strategy comprising one or more injector control signals to control operation of the fuel injector; and
   an output arranged to output the one or more control signals to the fuel injector,
   wherein the engine comprises an engine cylinder having a cylinder piston which is driven by means of a crankshaft between bottom dead center (BDC) and top dead center (TDC) to perform a compression stroke, the determined injection strategy comprising, in dependence on the received pressure signal, one or more of:
   a pilot injection of hydrogen fuel into the combustion chamber late in the compression stroke;
   a pilot injection of hydrogen fuel into the combustion chamber followed by a main injection of hydrogen fuel into the combustion chamber late either side of top dead center (TDC); and
   a pilot injection of hydrogen fuel into the combustion chamber early in the compression stroke.

2. A controller as claimed in claim 1, wherein the engine operating parameter comprises engine speed.

3. A controller as claimed in claim 1, where the engine operating parameter comprises engine load.

4. A controller as claimed in claim 1, wherein the processor is arranged to access a look up table which contains a plurality of injection strategies arranged by engine control parameter and the pressure of hydrogen fuel available for injection.

5. A controller as claimed in claim 4, wherein the processor is arranged to select an optimum injection strategy from the plurality of injection strategies in dependence on the received engine parameter and the received pressure signal.

6. A controller as claimed in claim 1, wherein the processor is arranged to access a mathematical model which is arranged to generate an injection strategy in dependence on the received engine parameter and the received pressure signal.

7. A controller as claimed in claim 1, wherein the one or more control signals in the determined injection strategy are arranged to control an amount of fuel injected by the injectors.

8. A controller as claimed in claim 1, wherein the one or more control signals in the determined injection strategy are arranged to control injector valve opening and closing times.

9. A method for determining an injection strategy for a fuel injector within a hydrogen fuel injection system within an engine, the engine comprising an engine cylinder having a cylinder piston which is driven by means of a crankshaft between bottom dead center (BDC) and top dead center (TDC) to perform a compression stroke, the method comprising:

receiving an engine operating parameter and a pressure signal associated with the pressure of hydrogen fuel available for injection from the injector in the fuel injection system;

determining an injection strategy for the injector in dependence on the received pressure signal and engine control parameter, the determined injection strategy comprising one or more injector control signals to control operation of the fuel injector; and outputting the one or more control signals to the fuel injector, wherein the determined injection strategy comprising, in dependence on the received pressure signal, one or more of:

a pilot injection of hydrogen fuel into the combustion chamber late in the compression stroke;

a pilot injection of hydrogen fuel into the combustion chamber followed by a main injection of hydrogen fuel into the combustion chamber late either side of top dead center (TDC); and a pilot injection of hydrogen fuel into the combustion chamber early in the compression stroke.

10. A mono-fuel hydrogen fuel injection system for an engine comprising:

a hydrogen fuel storage tank;

an accumulator rail in fluid communication with the storage tank;

one or more injectors in fluid communication with the accumulator rail;

a pressure transducer arranged to determine the pressure of hydrogen fuel within the fuel injection system;

a controller as claimed in claim 1.

11. A mono-fuel hydrogen fuel injection system as claimed in claim 10, wherein the accumulator rail is in direct fluid communication with the hydrogen fuel storage tank.

12. A mono-fuel hydrogen fuel injection system as claimed in claim 10, wherein the pressure of hydrogen fuel within the fuel injection system as determined by the pressure transducer corresponds to the pressure within the storage tank.

* * * * *